United States Patent [19]

Brophy

[11] Patent Number: 5,485,877
[45] Date of Patent: Jan. 23, 1996

[54] ROTARY REGENERATIVE HEAT EXCHANGER

[75] Inventor: Mark E. Brophy, Wellsville, N.Y.

[73] Assignee: ABB Air Preheater, Inc., Wellsville, N.Y.

[21] Appl. No.: 330,923

[22] Filed: Oct. 28, 1994

[51] Int. Cl.⁶ ................................................... F23L 15/02
[52] U.S. Cl. ....................................................... 165/8; 165/6
[58] Field of Search .................................. 165/9, 8, 6, 4, 165/909

[56] References Cited

U.S. PATENT DOCUMENTS

| | | | |
|---|---|---|---|
| 3,191,666 | 6/1965 | Brandt | 165/4 |
| 3,267,562 | 8/1966 | Chiang et al. | 165/6 |
| 3,280,894 | 10/1966 | Hochmuth | 165/6 |

FOREIGN PATENT DOCUMENTS 1017774  1/1966  United Kingdom ................. 165/8

Primary Examiner—John Rivell
Assistant Examiner—Christopher Atkinson
Attorney, Agent, or Firm—Chilton, Alix & Van Kirk

[57] ABSTRACT

The heat exchange baskets for a rotary regenerative air preheater are loaded radially into the rotor rather than axially from the duct end. The rotor is divided into sectors by diaphragms, and support gratings are provided in each rotor sector with the baskets being positioned and supported on the gratings. The angle of each rotor sector is smaller than the complimentary angle of each basket such that the outboard end of each basket can contact the diaphragms before the contact of the inboard end. The baskets thereby serve to stiffen the rotor structure while reducing bypass gaps.

4 Claims, 4 Drawing Sheets

ROTARY REGENERATIVE HEAT EXCHANGER

BACKGROUND OF THE INVENTION

The present invention relates generally to rotary heat regenerative heat exchangers and, more specifically, to improved means for supporting and positioning modular heat exchange baskets.

A rotary regenerative heat exchanger is employed to transfer heat from one hot gas stream, such as a flue gas stream, to another cold gas stream, such as combustion air. The rotor contains a mass of heat absorbent material which is first positioned in a passageway for the hot gas stream where heat is absorbed by the heat absorbent material. As the rotor turns, the heated absorbent material enters the passageway for the cold gas stream where the heat is transferred from the absorbent material to the cold gas stream.

In a typical rotary heat exchanger, such as a rotary regenerative air preheater, the cylindrical rotor is disposed on a vertical central rotor post and divided into a plurality of sector-shaped compartments by a plurality of radial partitions or diaphragms extending from the rotor post to the outer peripheral shell of the rotor. These sector-shaped compartments are loaded with modular heat exchange baskets which contain the mass of heat absorbent material commonly comprised of stacked plate-like elements.

The rotor is surrounded by a housing and the ends of the rotor are partially covered by sector plates located between the gas inlet and outlet ducts which divides the housing into hot gas and cold gas sides. In order to improve the efficiency of operation, it is conventional to provide seals, which are referred to as radial seal, on the ends of the rotor such that the seals will come into proximity with the sector plates and minimize the flow of gases between the hot and cold sides at the ends of the rotor. These seals are normally attached to the edges of the diaphragms.

The conventional modular heat exchange basket comprises an open frame and does not have solid side walls. These baskets are loaded axially into the rotor from the top end (duct end) and stay plates are located between and support radially adjacent baskets. To ensure that the baskets can be freely inserted, it is necessary to have the baskets undersized as compared to the compartments formed by the diaphragms and stay plates so that there is a clearance. Therefore, in order to provide the necessary heat exchange surface, it is necessary to have excess frontal area and consequently a larger rotor. Also, gaps exist around each basket permitting the bypass of the air and flue gas thus reducing the thermal efficiency.

SUMMARY OF THE INVENTION

The present invention relates to novel means for supporting and positioning heat exchange baskets in a rotary regenerative heat exchanger. The rotor is constructed for the loading and removal of the baskets in a radial direction through the side of the rotor rather than axially through the duct end. The baskets are positioned and supported in each sector so that they also act as supports between diaphragms and serve to stiffen the rotor structure while reducing bypass gaps. More specifically, the baskets are supported on gratings fixed between diaphragms at each end of the rotor and between layers of baskets and the angle of each rotor sector is smaller than the complimentary angle of each basket such that the outboard end of each basket can contact the diaphragms before the contact of the inboard end.

DESCRIPTION OF THE PREFERRED EMBODIMENT

Figure 1:
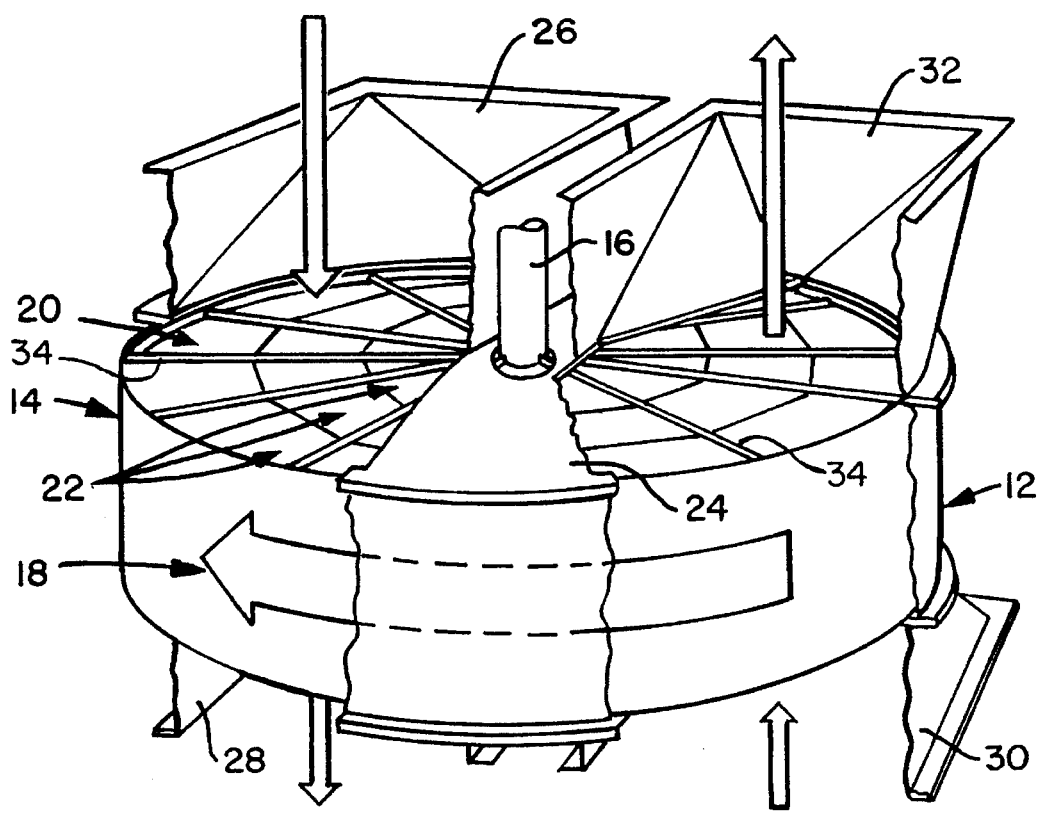
FIG. 1 is a general perspective view of a rotary regenerative air preheater.

FIG. 1 of the drawings is a partially cut-away perspective view of a typical air heater showing a housing 12 in which the rotor 14 is mounted on drive shaft or post 16 for rotation as indicated by the arrow 18. The rotor is composed of a plurality of sectors 20 with each sector containing a number of basket modules 22 and with each sector being defined by the diaphragms 34. The basket modules contain the heat exchange surface. The housing is divided by means of the flow impervious sector plate 24 into a flue gas side and an air side. A corresponding sector plate is also located on the bottom of the unit. The hot flue gases enter the air heater through the gas inlet duct 26, flow through the rotor where heat is transferred to the rotor and then exit through gas outlet duct 28. The countercurrent flowing air enters through air inlet duct 30, flows through the rotor where it picks up heat and then exits through air outlet duct 32.

Figure 2:
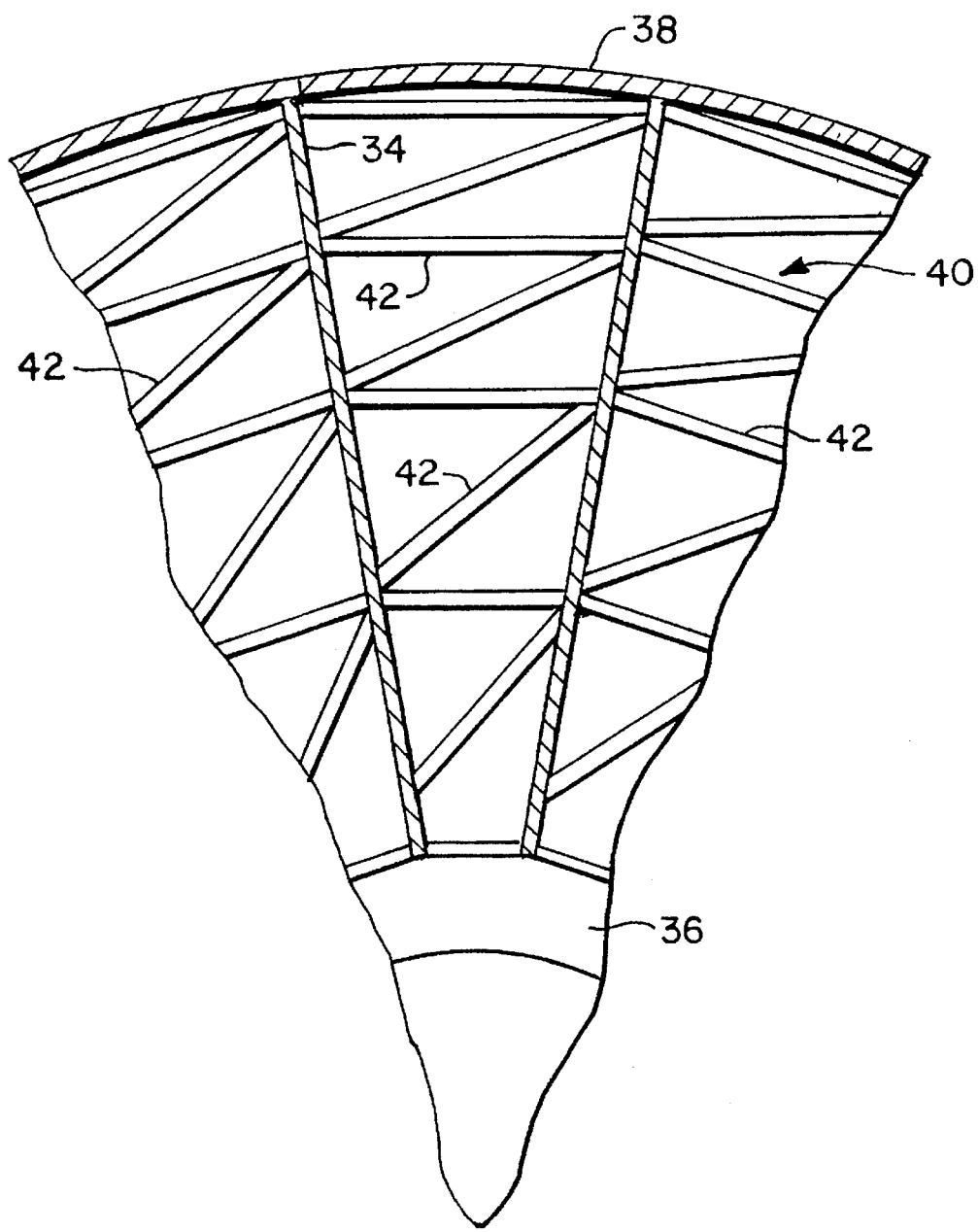
FIG. 2 is a top cross section view of a portion of the rotor of the preheater of FIG. 1 illustrating the support gratings in position between diaphragms.

Referring now to FIG. 2 which shows a plan view in cross section of a portion of a rotor, the diaphragms 34 are shown in cross section extending radially between the central portion 36 of the rotor and the rotor shell 38. This FIG. 2 is a view before the basket modules have been installed. Supported between and attached to the diaphragms 34 are the support gratings 40. These support gratings are formed from the members 42 and are normally truss-like structures. Any desired truss configuration can be used as long as it is structurally designed to support the baskets. The gratings are suitably attached to the diaphragms 34 such as by welding. As is conventional, there are a plurality of levels of gratings in each sector.

The baskets of the present invention are placed into the rotor through the sides or the periphery of the rotor rather than from the top end of the rotor. When baskets are loaded from the top, sufficient clearance must be provided and stay plates are located between radially adjacent baskets to hold them in place. The clearance around each basket means that the air preheater will require additional frontal (end) area in order to accommodate a certain amount of heat transfer surface. When the baskets are loaded from the side, very little clearance is needed and they can be fitted tightly into the sections and against each other so that most clearances are eliminated. This eliminates the need for stay plates and reduces the required frontal area of the air preheater needed for a specific amount of heat transfer surface.

Figure 3:
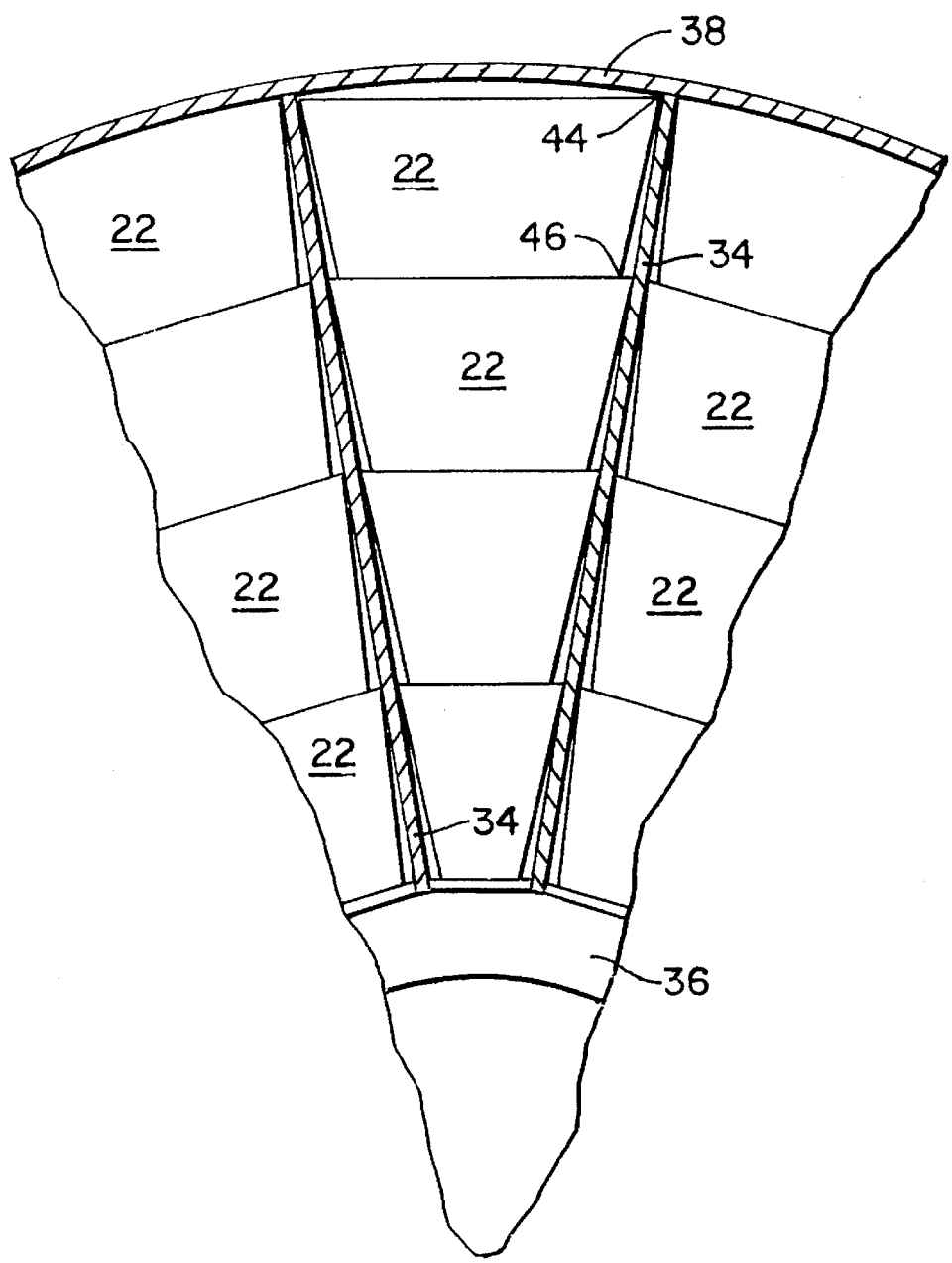
FIG. 3 is a similar top cross section view of a portion of the preheater of FIG. 1 illustrating the baskets in position.
Figure 4:
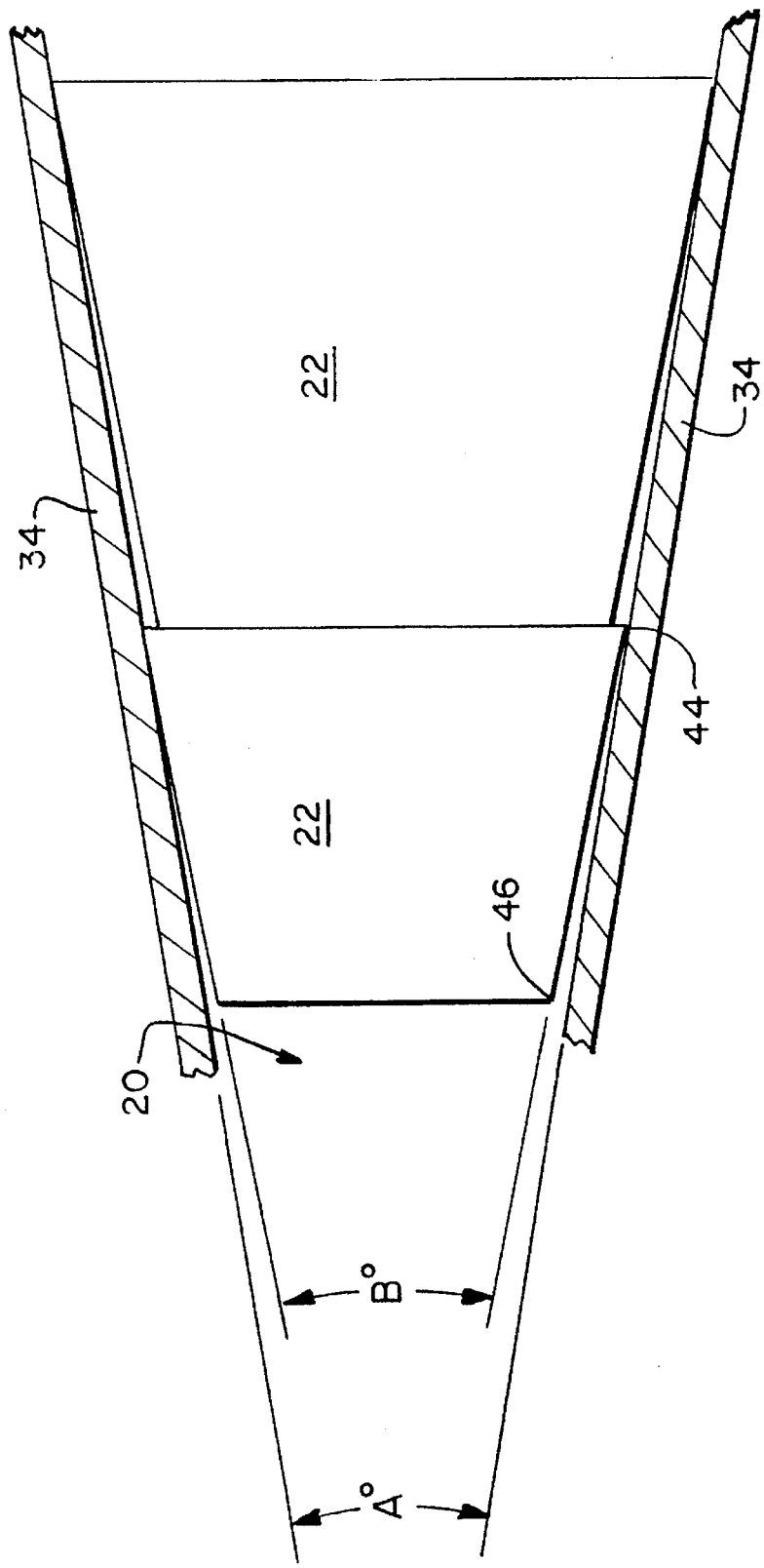
FIG. 4 is a more detailed view of some of the baskets in position and illustrating the angular relationship.

FIG. 3 shows a plan view in cross-section of the same portion of the rotor as in FIG. 2 with the baskets 22 in position and resting on the grating 40 (not shown in FIG. 3). Of course, as is conventional, there would normally be a plurality of layers of gratings and basket modules in each sector. As can be seen in this FIG. 3, the basket modules are tapered at an angle which is greater than the angle of taper of the sectors 20. This is more clearly shown in FIG. 4, which is an enlarged view showing the angular relationship between the taper angle A° of the sector 20 and the taper angle B° of each basket. Angle A° is smaller than angle B° such that the basket can be inserted radially into the rotor to the position where the outboard corners 44 of the basket engage the diaphragm 34 while the inboard corners 46 are still spaced from the diaphragms. The angular difference prevents the inboard end of each basket from contacting the diaphragm before the outboard end makes contact. The sector angle A° for rotor may vary from about 7.5° to 30°, but in any case, the angle B° for the baskets is generally from 0.2° to 0.6° larger. By accurately setting the outboard length of the baskets during the manufacturing process with appropriate fixtures as well as controlling the inboard-to-outboard distance, each basket will fit into the sector at an exact position with little or no radial gap between the outboard end of one basket and the adjacent inboard end of the next basket. Also, since the outboard corners engage the diaphragms and because the angular difference between the baskets and sectors is small, there are only very small side gaps. The overall effect is that the total flow area through gaps that by-pass the baskets is significantly reduced over the gap flow area that exists with conventional end (duct) removal baskets. Also, because the baskets actually engage the diaphragms, they act as supports between the diaphragms.

The baskets are side installed by pushing them in until the outboard corners contact the diaphragms. The baskets may then be fixed in position by suitably pinning at least the outboard basket to the diaphragms.

I claim:

1. A rotor assembly for a vertical shift rotary regenerative heat exchanger, said rotor assembly having a center portion, a top and a bottom and mounted on an axially extending rotor shaft and comprising:

a) a cylindrical outer rotor shell;

b) diaphragm plates extending radially in said rotor assembly essentially from said center portion thereof to said outer rotor shell and from said top to said bottom thereof so as to divide said rotor into a plurality of sector-shaped compartments, said diaphragm plates being at a selected angle to each other;

c) a plurality of axially spaced horizontally extending support gratings located in each sector-shaped compartment mounted between said diaphragms, said support gratings being of an open structure to permit fluid flow axially therethrough;

d) a plurality of truncated sector-shaped heat exchange baskets supported on each support grating radially adjacent to each other and extending generally from said center portion to said outer rotor shell, each of said baskets being constructed to have a sector shape with an included angle is greater than said selected angle of said sector-shaped compartment.

2. A rotor assembly as recited in claim 1, wherein said included angle of said sector shape of said baskets is from 0.2° to 0.6° greater than said selected angle of said sector-shaped compartments.

3. A rotor assembly for a vertical shift rotary regenerative heat exchanger, said rotor assembly having a center portion and mounted on an axially extending rotor shaft and comprising:

a) a cylindrical outer rotor shell;

b) diaphragm plates extending radially in said rotor assembly essentially from said center portion thereof to the outer rotor shell so as to divide said rotor into a plurality of sector-shaped compartments, said diaphragm plates being a selected angle to each other;

c) a plurality of truncated sector-shaped heat exchange baskets located in each sector-shaped compartment and extending generally from said center portion to the outer shell, each of said baskets being constructed to have a sector shape with an included angle which is greater than said selected angle of said sector-shaped compartment.

4. A rotor assembly as recited in claim 3, wherein said included angle of said sector shape of said baskets is from 0.2° to 0.6° greater than said selected angle of said sector-shaped compartments.

* * * * *

UNITED STATES PATENT AND TRADEMARK OFFICE
CERTIFICATE OF CORRECTION

PATENT NO. : 5,485,877
DATED : January 23, 1996
INVENTOR(S) : Mark E. Brophy

It is certified that error appears in the above-indentified patent and that said Letters Patent is hereby corrected as shown below:

Column 4, line 13, insert --which-- before "is".

Signed and Sealed this

Twenty-second Day of October, 1996

Attest:

BRUCE LEHMAN

*Attesting Officer*     *Commissioner of Patents and Trademarks*